Dec. 1, 1970   E. JUSTI ET AL   3,544,377
OXYGEN-HYDROGEN STORAGE BATTERY CELL
Filed March 2, 1967   2 Sheets-Sheet 1

United States Patent Office 3,544,377
Patented Dec. 1, 1970

3,544,377
OXYGEN-HYDROGEN STORAGE BATTERY CELL
Eduard Justi and Ralf Wendtland, Braunschweig, Germany, assignors of one-half each to Varta Aktiengesellschaft, Hagen, Westphalia, Germany, and Siemens Aktiengesellschaft, Berlin and Munich, Germany, both corporations of Germany
Filed Mar. 2, 1967, Ser. No. 620,051
Claims priority, application Germany, Mar. 26, 1966,
A 51,976
Int. Cl. H01m 27/00
U.S. Cl. 136—86
11 Claims

ABSTRACT OF THE DISCLOSURE

Oxygen-hydrogen cell for storing electric energy by electrolysis of water and recombination of electrolysis gas. The same cell is used for both steps. Valve electrode covers are on the electrodes. Both nickel and silver oxygen electrodes are required.

---

Figure 1:
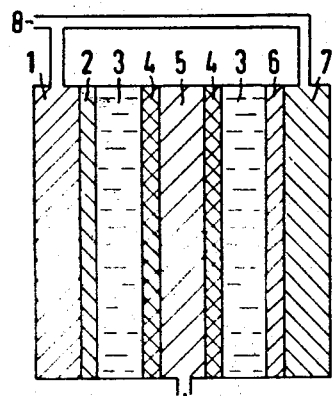

The object of the present invention is an oxygen-hydrogen cell for storing electric energy by electrolysis of water, storage and subsequent recombination of the electrolysis gases. It is known to store electric energy by using excess energy to electrolyze water, storing the electrolytic gases, hydrogen and oxygen, possibly in a compressed form, and by delivering them later to an electrochemical oxygen-hydrogen cell wherein electric energy is released by a recombination of the gases into water. In the past, the reverse processes of electrolysis and recombination were carried out in separate cells. An improvement was achieved by development of cells wherein both electrolysis and recombination could be carried out. This was achieved especially by using the so-called double-skeleton catalyst ("DSK") electrode. This electrode contains Raney nickel, embedded as a catalyst in a metallic support structure, and works as a reversible hydrogen electrode (German Patent 1,167,406).

Further progress was achieved by the valve electrode, disclosed in U.S. Pat. 3,201,282, wherein a fine-pore cover layer having a high hydrogen overvoltage is applied on the electrolytic side of a reversible DSK working layer. During a current reversal, this electrode also reverses the current direction of the gas under constant pressure. By leading the pressure prevailing in the gas chamber back to the electrolyte, by keeping the pressure difference between the gas and the electrolyte chambers constant (according to British Patent 951,799), one obtains a widely useful cell for storing, by means of pressure electrolysis and recombination of the electrolysis gases, without the necessity of having compressors for the gases.

Nickel electrodes may be used in storage battery cells as oxygen electrodes, however these have only a slight polarization suitable for oxygen precipitation. Such electrodes are hardly suitable as oxygen dissolving cathodes. Therefore, for the purpose of improving the energy balance, German Patent 1,200,903 suggests the use of Raney nickel and Raney silver alongside each other in DSK electrodes. Such electrodes combine the good qualities of the nickel for oxygen precipitation with those of the silver as oxygen dissolving catalysts. It was shown, however, that the silver in the form of silver oxide is dissolved in the alkaline electrolyte during oxygen precipitation, despite the low oxygen over-voltage of the nickel. Thus, the oxygen electrodes become unusable after a time.

The present invention has as an object the elimination of these difficulties while at the same time maintaining the silver as a catalyst for the cathodic process and the nickel as a catalyst for the anodic process. We achieve this oxygen-hydrogen cell for storing electric energy by electrolysis of water, storage and subsequent recombination of electrolysis gases while re-obtaining electric energy by using a double-sided operating hydrogen electrode having oxygen electrodes on both sides of the hydrogen electrode. One oxygen electrode contains nickel and functions as an oxygen anode, whereas the other oxygen electrode contains silver and is used exclusively as an oxygen cathode.

Figure 2:
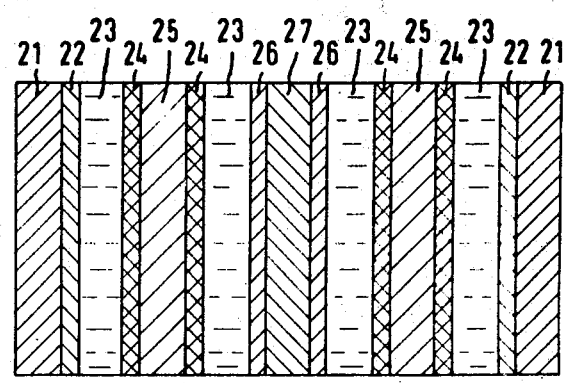
Figure 3:
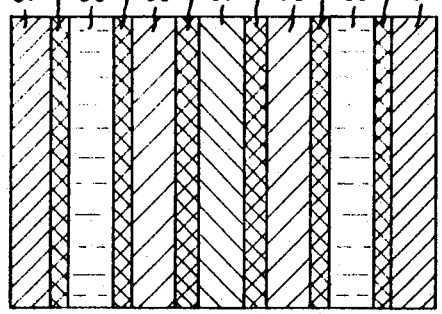
Figure 4:
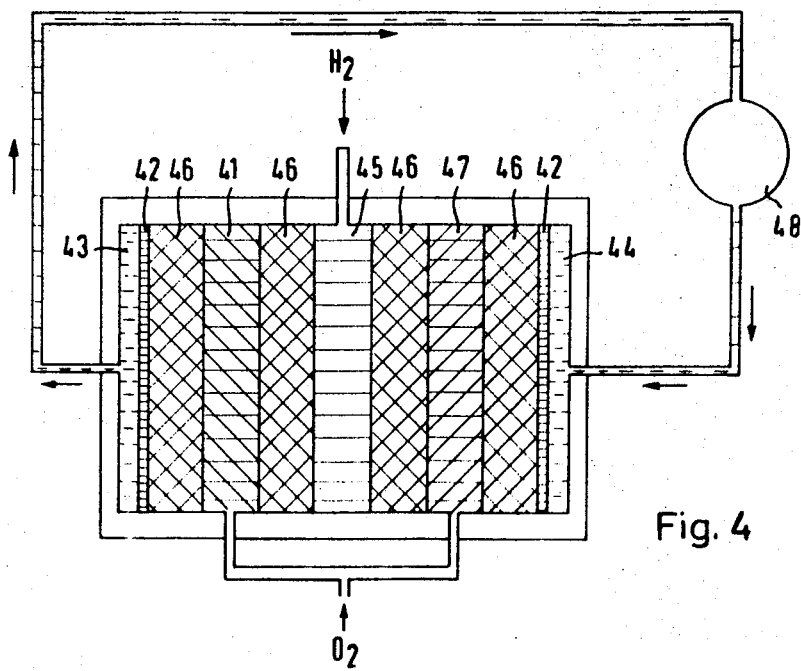
Figure 5:
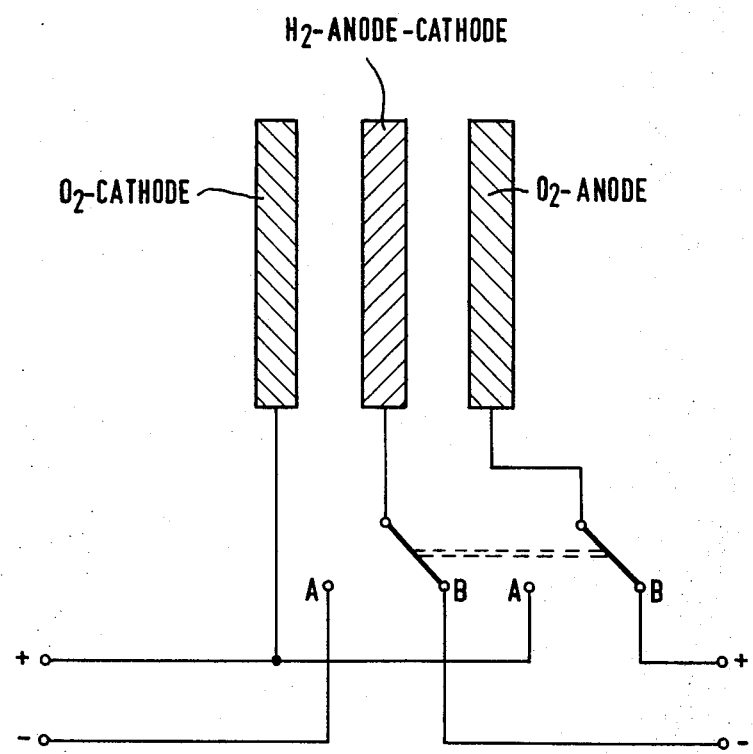

The invention will be described further with respect to the drawing, in which:

FIG. 1 shows one embodiment of the cell;
FIG. 2 shows a cell for parallel use;
FIG. 3 shows another cell for parallel use;
FIG. 4 shows still another cell for parallel use; and
FIG. 5 schematically shows the switching position for the two stages.

In FIG. 1, the nickel-containing operating layer 1 of the oxygen anode, which is covered by a fine-pored cover layer 2, is in contact with the electrolyte chamber 3. This cover layer is comprised of a material having such a high oxygen overvoltage that no oxygen evolution is possible thereon. Thus, it operates as a valve electrode. The hydrogen electrode in the center is also developed as a valve electrode, whose operating layer 5 is sealed off against the electrolyte 3 by two cover layers 4 having a high hydrogen overload. The oxygen cathode also has a fine-pored cover layer 6, which may consist of any desired material. This layer 6 covers the silver-containing operating layer 7 of the oxygen cathode. The oxygen to both oxygen electrodes is supplied or removed via the gas line 8, while the hydrogen is supplied or removed via line 9.

In greater detail, the operating layer of the oxygen anode consists of DSK material and is produced as follows:

Raney nickel (activated in 6 n KOH, preserved with $H_2O_2$ or $KIO_3$, dried with air) is hot pressed at a pressure of 1.3 t./cm.$^2$, with carbonyl nickel and KCl (diameter $< 100\mu$) in a mixing ratio of 1:2:0.5 at 450° C. After dissolving the KCl, the layer consists only of nickel carbonyl and superficially oxidized Raney nickel, which has a small residual content of aluminum. Hence: Ni-content $> 90\%$.

The cover layer of the oxygen anode may consist of titanium or a titanium alloy. These metals are particularly suitable due to their high $O_2$ overvoltage. Fine-pored, non-conducting synthetic material layers may also be used. Sinter layers of gold powder or of nickel carbonyl, vaporized with gold, may also be utilized.

The operating layers of the $H_2$ valve electrodes were produced from a mixture of (activated and preserved) Raney nickel, electrolyte copper (diameter $<15\mu$) and KCl filter (diameter $<100\mu$) at a ratio 1:2:0.5. Electrolyte copper was used for the cover layers of this electrode.

The cover layers of the oxygen cathode consist of carbonyl nickel. The operating layers were produced of a mixture of Raney silver alloy (diameter$<50\mu$), carbonyl nickel and KC (diameter$<100\mu$, mixing ratio 1:3:0.5). After dissolving the KCl filler, the DSK operating layer consists of about 25% (weight) of Raney-Ag alloy. The Raney-Ag alloy, on the other hand, consists of Ag and Al at a weight ratio 1:1, so that the work layer contains approximately 15 weight-percent Ag. The catalytic activity of this alloy is increased by cooling from the production temperature to room temperature or lower.

While it is necessary during electrolysis, that the silver-containing oxygen electrode 7 not be traversed by current passage, both oxygen electrodes may be connected in parallel during the recombination process. Although, in the latter instance, the current is delivered mainly by the silver oxygen electrode, the slight share delivered by the nickel oxygen electrode improves the energy balance. The electric circuit need not be disclosed in detail, as it is determined by the method of operation. Thus, a relay, depending on the current direction or the cell voltage, suffices to cut off the silver containing oxygen electrode from the mutual current supply line. However, FIG. 5 schematically and self-explanatorily shows such circuitry.

Both electrolyte chambers may be connected to a mutual electrolyte circuit. However, a hydrostatic pressure drop may also be produced between the two chambers. The pressure drop results in a rinsing of the pores of the hydrogen electrode with a fresh electrolyte solution, so that diffusion polarization cannot occur in the pores which are filled with electrolyte. However, even if the electrolyte does not flow, the function of the hydrogen electrode is improved since electrolyte is injected into the electrode region of the strongly charged side from the side which is only slightly charged during recombination operations.

Another embodiment of the invention is shown in FIG. 2. In this embodiment, two cells are connected in parallel, by combining two equal oxygen electrodes into one, operating on both sides. Cover layers 26 are applied on both sides of the appropriate oxygen operating layer 27. Two individual oxygen operating layers 21 having an inverse function toward 27 are covered by cover layers 22. The hydrogen electrodes have operating layer 25 and cover layers 24. The electrolyte chambers are marked 23. Since the modified method can be applied either to the silver containing oxygen electrodes or to the nickel containing ones, a cell can be obtained having as many electrodes connected in parallel as desired. The oxygen and hydrogen inlet and outlet are not shown but correspond to those of FIG. 1.

The space saving series connection of cells may also be obtained by arranging two oxygen electrodes of adjacent cells separated from each other by a common gas chamber therebetween.

A particularly simple embodiment is obtained by substituting a common non-conducting diaphragm upon which the operating layers are tightly pressed for the cover layers of two adjacent electrodes. This arrangement is illustrated in FIG. 3. A block is obtained consisting of an oxygen electrode layer 37 with diaphragms 36 fitting on both sides and hydrogen valve electrodes 35 which, however, carry no additional cover layers on the sides facing the diaphragms. The block is sealed by the outer cover layers 34 of the two hydrogen valve electrodes. The electrolyte chambers are shown at 33 and the cover layers 32 seal the oxygen operating layers 31 having functions inverse to 37. In the interest of simplicity, gas lines are not shown in the drawing.

The arrangement shown in FIG. 3 may be duplicated by making the end electrodes operate on both sides and by mirroring the cell at the working layer 31. In this device too, the individual electrodes or the center electrode block, may be rinsed by establishing a hydrostatic pressure difference between the adjacent electrolyte chambers. This method of operation is particularly recommendable when large amounts of heat are to be removed, since the cooled electrolyte may be passed at great speed through each second electrolyte chamber while a slight overpressure is permitted in the remaining electrolyte chambers.

Finally, the electrodes may be especially tightly packed, if one relinquishes free electrolyte chambers all together and substitutes electrolyte-impregnated diaphragms for the cover layers 34 and 32 in FIG. 3. The result is the cell shown in FIG. 4, wherein 41 is the nickel containing oxygen electrode, 45 the hydrogen electrode and 47 the silver containing oxygen electrode. Between these single layer electrodes are the equal diaphragms 46. Porous support layers 42 serve for stabilizing the end diaphragms. Under the influence of a pressure drop produced in the pump 48, the electrolyte flows from the chamber 44 into the electrolyte chamber 43, whereby the electrodes and diaphragms lying in between are effectively rinsed. The operational gases are led to the electrodes from the edge or removed therefrom in the manner shown in FIG. 4.

The cell according to the invention is suitable in combination with a pure $H_2$—$O_2$ fuel element, especially for the energy supply of single, stationary installations. By pure fuel element, we mean a cell which is either of the same or of a different construction, but which contains exclusively silver containing oxygen cathodes. This is of advantage, if the electric energy is supplied with a low voltage, and if one desires to obtain a higher voltage during recombination in a larger number of series connected fuel cells with smaller electrode cross sections. This type of installation acts as a direct current transformer wherein the chemical energy of the electrolyte gases occurs as an intermediary energy form.

Since the electrolyte has a depletion in the anode an enrichment in the cathode of $OH^-$ ions, it is preferable to work, in the case of the oxygen hydrogen storage cell, close to the conductance capacity minimum of the electrolyte, i.e. at 27% KOH.

In summation, the advantages achieved by the present invention may best be described as follows:

Prior to the filing date, two different, separate cells were needed in order to electrolyze firstly, water or lye and secondly, to recombine conductively the electrolysis gases. Our invention lies in utilizing one and the same cell for electrolysis and subsequent recombination having valve electrodes as electrolytic compressors for energy storing. This saves almost 50% of investment, weight and volume. After it had been proved in extensive tests that the oxygen-dissolving electrodes are not necessarily suitable for oxygen precipitation electrodes, particularly oxygen valve electrodes, the invention provides that with only a small increase in investment, volume and weight, a third electrode be inserted into the unit cell, which only slightly increases the total weight as well as the investment and volume. On the other hand, this results in a considerably longer life span. If one considers that in the recombination of the $O_2$, both electrodes may be used, the polarization per electrode as a unit, is cut in half. This is overwhelmingly concentrated on the oxygen side, thus increasing the life span without an effective increase in weight, volume and investment, relative to output.

We claim:

1. Oxygen hydrogen cells for storing electric energy by electrolysis of water to produce gases, storage and subsequent recombination of the electrolysis gases to produce electrical energy; which comprise a bilaterally operating hydrogen electrode with oxygen electrodes arranged on both sides thereof, the catalyst of one of said oxygen electrodes consists essentially of nickel and the catalyst of the other oxygen electrode consists essentially of silver, said electrodes are constructed and arranged so that during the production of electricity, the hydrogen electrode and at least the silver containing electrode are connected into the circuit, and during the electrolysis of water, only the hydrogen electrode and the nickel containing electrode are connected into the circuit, and the storage cell is provided with connecting lines for the inlet and outlet of hydrogen and oxygen.

2. The cells of claim 1, wherein the bilaterally arranged oxygen electrodes consist of a catalytically operating porous layer with an average pore diameter $r_1$ and a and a catalytically inactive cover layer whose average pore diameter $r_2$ is smaller than $r_1$ and which covers the operating layer.

3. The cells of claim 2, wherein the cover layer of the nickel containing operating layer consists of a material having such a high oxygen overvoltage, that oxygen electrolytic evolution thereon is precluded.

4. The cells of claim 3, wherein the oxygen electrodes consist of a porous operating layer covered on both sides with a fine-pore cover layer.

5. The cell of claim 4, wherein the oxygen electrodes on both sides of the hydrogen electrode are connected to the same oxygen line.

6. The cell of claim 1, wherein the hydrogen electrode consists of a porous operating layer and bilaterally arranged fine-pore cover layers, whose hydrogen overvoltage is so high that electrolytic evolution of hydrogen thereon is precluded.

7. The cell of claim 5, wherein two nickel or silver oxygen electrodes of adjacent and parallel connected cells are combined into one bilaterally operating electrode.

8. The cell of claim 7, wherein two oxygen electrodes of adjacent and series connected cells are electrically insulated from each other and equipped with a mutual gas space between them.

9. The cell of claim 5, wherein the cover layers of two adjacent electrodes are substituted by mutual non-conducting diaphragms, upon which the operating layers are tightly pressed.

10. The cell of claim 5, wherein electrolyte-impregnated diaphragms act as free electrolyte chambers.

11. The cell of claim 10, wherein the end diaphragms are stabilized by porous support layers.

References Cited
UNITED STATES PATENTS

| | | | |
|---|---|---|---|
| 3,132,972 | 5/1964 | Ludwig | 136—86 |
| 3,220,937 | 11/1965 | Friese et al. | 136—86 |
| 3,317,348 | 5/1967 | Winsel | 136—86 |

WINSTON A. DOUGLAS, Primary Examiner

H. A. FEELEY, Assistant Examiner